United States Patent Office 3,374,253
Patented Mar. 19, 1968

3,374,253
PROCESS FOR THE PREPARATION OF
17(20)-21-AL PREGNENES
John H. Fried, Palo Alto, Calif., assignor to Syntex Corporation, Panama, Panama, a corporation of Panama
No Drawing. Filed Apr. 25, 1966, Ser. No. 544,855
10 Claims. (Cl. 260—397.3)

This invention relates to a novel process for the preparation of cyclopentanophenanthrene derivatives.

More particularly, this invention relates to a novel process for the preparation of $\Delta^{17(20)}$-21-al pregnanes from the corresponding 17-ketosteroid. The $\Delta^{17(20)}$-21-al pregnanes prepared by the present invention are valuable intermediates for the preparation of pharmacologically important compounds such as the corticoids, see for example U.S. Patents 2,577,018, 2,683,153, 2,732,384, 3,120,518, and 3,165,444.

Prior to the present invention, the preparation of $\Delta^{17(20)}$-21-al pregnanes from 17-ketosteroids was accomplished by, for example, reacting the 17-ketosteroid with a Grignard derivative of ethoxyacetylene to obtain the corresponding 17α-ethoxyethynyl-17β-hydroxy steroid which was then selectively hydrogenated to the corresponding 17α-ethoxyvinyl-17β-hydroxy compound followed by treatment with sulfuric acid in dioxane to obtain the unsaturated aldehyde, that is, the $\Delta^{17(20)}$-21-al pregnane. This method and other prior art methods involve several steps which create undesired side products and cause the preparation of $\Delta^{17(20)}$-21-al pregnanes to be unnecessarily complex.

The primary object of the present invention is to provide a process for the preparation of $\Delta^{17(20)}$-21-al pregnanes which overcomes the aforementioned disadvantages. Other objects and advantages will become apparent as the invention is hereinafter described in detail.

In accordance with the present invention, $\Delta^{17(20)}$-21-al pregnanes are prepared by the reaction of a 17-ketosteroid with at least one molar equivalent of $LiCH_2-CH=N-R$, wherein R represents a lower alkyl containing from 1 to 6 carbon atoms or a cycloalkyl group containing from 3 to 7 carbon atoms such as methyl, ethyl, isopropyl, butyl, cyclohexyl, cyclopentyl and the like, in an ether solvent medium followed by acid hydrolysis.

The novel process of the present invention can be illustrated as follows using only the applicable D-ring of the steroid nucleus.

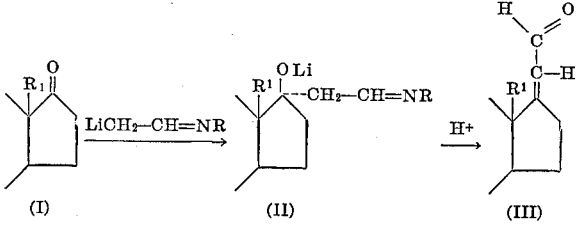

In the above formulas, R represents a lower alkyl or cycloalkyl group as defined hereinabove and $R^1$ represents a lower alkyl group containing from 1 to 4 carbon atoms, that is methyl, ethyl, propyl or butyl.

In practicing the novel process outlined above, the starting material I, a 17-ketosteroid, is reacted with at least one molar equivalent of $LiCH_2-CH=NR$, wherein R is a lower alkyl or cycloalkyl group, in an ether solvent medium such as diethyl ether, dioxane, tetrahydrofuran, and the like. This reaction may be conducted at a temperature within the range of about room temperature to the reflux temperature of the ether solvent. The reaction generally takes from about 1 hour or more to about 24 hours.

The second step of the process is to subject the steroid II to acid hydrolysis which furnishes the desired unsaturated aldehyde steroid III. This step may be accomplished by adding a source of hydrogen ions to the reaction mixture resulting from the first step of the process. As a source of hydrogen ions, there may be employed water or water containing a small amount of an inorganic or a hydrocarbon carboxylic acid such as hydrochloric acid, sulfuric acid, acetic acid, and the like, preferably aqueous acetic acid, at room temperature or above.

The lithium imines characterized by the formula $LiCH_2-CH=N-R$, as described hereinabove, may be prepared in the conventional manner as by the reaction of acetaldehyde with, e.g. cyclohexylamine to obtain the Schiff base. The Schiff base and a lithium alkylamide, e.g. lithium diisopropylamide are then dissolved in ether and allowed to stand at room temperature for from 1 to 6 hours furnishing the desired lithium imine. Lithium alkylamides may be prepared, for example, by the reaction of an alkyl amine with lithium hydride.

The expression "17-ketosteroids" as used herein and in the appended claims is understood to refer to steroids having an oxo function at the carbon-17 position. The steroid nucleus may be saturated, unsaturated or aromatic. Typical 17-ketosteroids which may be employed in the process of the present invention are 3β-hydroxyandrost-5-en-17-one, 3β-hydroxy-5α-androstan-17-one, 3α-hydroxy-5β-androstan-17-one, 3-hydroxy-or 3-methoxyestra-1,3,5(10)-trien-17-one, 3-hydroxy- or 3-methoxyestra-1,3,5(10),9(11)-tetraen-17-one, 3-methoxyestra-2,5 (10)-dien-17-one, 3,11β-dihydroxyestra-2,5(10)-dien-17-one 3-methyl ether, 3,3-cycloalkylenedioxyandrost-5-ene-11,17-dione, 3-ethoxyandrosta-3,5-diene-11,17-dione, 3-ethoxy-18-ethylandrosta-3,5-diene-11,17-dione, 3,11α-dihydroxyandrosta-3,5-dien-17-one 3-ethyl ether, and the corresponding compounds having a free 3-hydroxyl function or the acylate thereof. In the case of the acylates, it is preferred to employ the more stable esters such as benzoate, and the like.

The following detailed examples are provided to illustrate the present invention but not to limit the scope thereof.

Example 1

A mixture of 30 grams of 3β-hydroxyandrost-5-en-17-one, 2.2 molar equivalents of 2-lithioethyl-N-cyclohexylimine

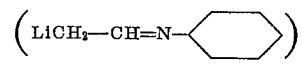

and 200 ml. of diethyl ether is stirred at room temperature for about 24 hours. Thereafter, the reaction mixture is poured into two liters of water containing about 25 ml. of acetic acid, stirred and then filtered. The product is then washed with water and dried affording 3β-hydroxypregna-5,17(20)-dien-21-al which may be purified by chromatography or crystallization from acetone:hexane.

Example 2

A mixture of 35 grams of 3-methoxyestra-2,5(10)-dien-17-one, 1.2 molar equivalents of 2-lithioethyl-N-cyclohexylimine, and 240 ml. of diethyl ether is stirred at room temperature for about 24 hours. Then, the reaction mixture is poured into two liters of water containing about 30 ml. of acetic acid, stirred, and filtered. The solid product is washed with water and dried affording 3-oxo-19-nor-pregna-4,17(20)-dien-21-al.

Example 3

A mixture of 30 grams of 3-methoxyestra-1,3,5(10)-trien-17-one, 1.2 molar equivalents of 2 lithioethyl-N-cyclohexylimine, and 200 ml. of diethyl ether is stirred for about 20 hours at room temperature. Thereafter, the reaction mixture is poured into about two liters of water containing about 25 ml. of acetic acid and filtered. The solid product is washed with water and dried to afford 3-methoxypregna-1,3,5(10),17(20)-tetraen-21-al.

*Example 4*

A mixture of 30 grams of 3-ethoxyandrosta-3,5-diene-11,17-dione, 1.2 molar equivalents of 2-lithioethyl-N-ethylimine

and 175 ml. of diethyl ether is stirred at room temperature for about 24 hours. Thereafter, the reaction mixture is poured into two liters of water containing about 30 ml. of acetic acid and filtered. The solid reaction product is washed with water and dried to afford 3,11-dioxo-pregna-4,17(20)-dien-21-al.

*Example 5*

By repeating the procedure of Example 1, 3β-hydroxy-5α-androstan-17-one is converted into 3β-hydroxy-5α-pregn-17(20)-en-21-al.

Similarly, 3α-hydroxy-5β-androstan-17-one is converted into the corresponding 3α-hydroxy-5β-pregn-17(20)-en-21-al.

*Example 6*

By repeating the procedure of Example 2, 3β-tetrahydropyran-2-yloxy-5α-androstan-17-one is transformed into the corresponding 3β-hydroxy-5α-pregn-17(20)-en-21-al.

Likewise, the tetrahydropyranyl ether of 3α-hydroxy-5β-androstan-17-one and 3-hydroxyestra-1,3,5(10)-trien-17-one are converted into 3α-hydroxy-5β-pregn-17(20)-en-21-al and 3-hydroxypregna-1,3,5(10),17(20)-tetraen-21-al, respectively.

The tetrahydropyranyl ether starting materials are prepared by treating the corresponding free hydroxyl compound with dihydropyran in the presence of an acid catalyst, see for example, U.S. Patent 2,637,728.

What is claimed is:

1. A process for the preparation of $\Delta^{17(20)}$-21-al pregnanes which comprises reacting a 17-ketosteroid with at least one molar equivalent of LiCH$_2$—CH=N—R, wherein R is selected from the group consisting of a lower alkyl group containing from 1 to 6 carbon atoms and a cycloalkyl group containing from 3 to 7 carbon atoms, in an ether solvent medium and subjecting the thus-formed compound to acid hydrolysis.

2. A process according to claim 1 wherein R is cyclohexyl.

3. A process according to claim 1 wherein R is cyclohexyl and said ether solvent is diethyl ether.

4. A process according to claim 1 wherein R is cyclohexyl, said ether is diethyl ether, and said acid hydrolysis is accomplished by the use of aqueous acetic acid.

5. A process according to claim 4 wherein said 17-keto-steroid is 3-ethoxyandrosta-3,5-dien-17-one.

6. A process according to claim 4 wherein said 17-keto-steroid is 3-methoxyestra-1,3,5(10)-trien-17-one.

7. A process according to claim 4 wherein said 17-keto-steroid is 3-ethoxy-11β-hydroxyandrosta-3,5-dien-17-one.

8. A process according to claim 4 wherein said 17-keto-steroid is 3-ethoxyandrosta-3,5-diene-11,17-dione.

9. A process according to claim 4 wherein said 17-keto-steroid is 3α-hydroxy-5β-androstan-17-one.

10. A process according to claim 4 wherein said 17-keto-steroid is 3β-hydroxy-5α-androstan-17-one.

References Cited

UNITED STATES PATENTS 3,318,917   5/1967   Benn _____ 260—397.1

LEWIS GOTTS, *Primary Examiner.*

T. M. MESHBESHER, *Assistant Examiner.*